(12) United States Patent
Fu et al.

(10) Patent No.: US 10,223,330 B2
(45) Date of Patent: Mar. 5, 2019

(54) GROUP-AWARE COMMAND-BASED ARRANGEMENT OF GRAPHIC ELEMENTS

(71) Applicants: City University of Hong Kong, Kowloon (HK); The Hong Kong University of Science and Technology, Hong Kong (CN)

(72) Inventors: Hongbo Fu, Sha Tin (HK); Pengfei Xu, New Territories (HK); Chiew-Lan Tai, Kowloon (HK)

(73) Assignees: CITY UNIVERSITY OF HONG KONG, Kowloon (HK); THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 569 days.

(21) Appl. No.: 14/835,992

(22) Filed: Aug. 26, 2015

(65) Prior Publication Data
US 2017/0061030 A1 Mar. 2, 2017

(51) Int. Cl.
*G06F 17/30* (2006.01)
*G06F 16/901* (2019.01)
*G06F 16/27* (2019.01)

(52) U.S. Cl.
CPC ........ *G06F 16/9024* (2019.01); *G06F 16/278* (2019.01)

(58) Field of Classification Search
CPC ................................. G06F 17/90858
USPC ................................. 707/718, 719
See application file for complete search history.

(56) References Cited

U.S. PATENT DOCUMENTS

| 7,720,773 | B2 * | 5/2010 | Szummer | G06K 9/00409 706/20 |
| 9,785,673 | B2 * | 10/2017 | Bornea | G06F 17/30469 |
| 2007/0156617 | A1 * | 7/2007 | Szummer | G06K 9/00409 706/20 |
| 2012/0239797 | A1 * | 9/2012 | Agrawal | H04L 41/145 709/224 |
| 2015/0149440 | A1 * | 5/2015 | Bornea | G06F 17/30442 707/719 |

OTHER PUBLICATIONS

Xu, P., Fu, H., Igarashi, T., and Tai, C.-L. "Global beautification of layouts with interactive ambiguity resolution". UIST 14, to appear (2014).
Xu, et al. "GACA: Group-Aware Command-based Arrangement of Graphic Elements," 15 pages. Last accessed:Dec. 10, 2015.
Baudisch, P., Cutrell, E., Hinckley, K., and Eversole, A. "Snap-and-go: helping users align objects without the modality of traditional snapping", CHI '05 (2005), 301-310.

(Continued)

*Primary Examiner* — Baoquoc N To
(74) *Attorney, Agent, or Firm* — Amin, Turocy & Watson, LLP

(57) ABSTRACT

Group aware command based arrangement is provided. An alignment command can be received, an undirected graph comprising a group of graph nodes connected by graph edges can be constructed, wherein the group of graph nodes represent a group of selected display elements, and the undirected graph can be partitioned as a function of identifying a severable graph edge of the graph edges that connects a pair of graph nodes included in the group of graph nodes to form a first collection of graph nodes and a second collection of graph nodes.

21 Claims, 15 Drawing Sheets

(56) References Cited

OTHER PUBLICATIONS

Bier, E. A., and Stone, M. C. "Snap-dragging" ACM SIGGRAPH Computer Graphics, vol. 20 (1986), 233-240.

Dwyer, T., Marriott, K., and Wybrow, M. "Dunnart: A constraint-based network diagram authoring tool" Graph Drawing (2009), 420-431.

Frisch, M., Kleinau, S., Langner, R., and Dachselt, R. "Grids & guides: multi-touch layout and alignment tools", CHI '11 (2011), 1615-1618.

Frisch, M., Langner, R., and Dachselt, R. "Neat: a set of flexible tools and gestures for layout tasks on interactive displays", TS '11 (2011), 1-10.

Galindo, D., and Faure, C. "Perceptually-based representation of network diagrams", ICDAR '97, vol. 1 (1997), 352-356.

Heo, S., Lee, Y.-K., Yeom, J., and Lee, G. "Design of a shape dependent snapping algorithm" CHI EA '12 (2012), 2207-2212.

Igarashi, T., and Hughes, J. F. "A suggestive interface for 3D drawing", UIST 'OJ (2001), 173-181.

Igarashi, T., Matsuoka, S., Kawachiya, S., and Tanaka, H. "Interactive beautification: a technique for rapid geometric design", U/ST(l997), 105-114.

Nan, L., Shari, A., Xie, K., Wong, T.-T., Deussen, 0., Cohen-Or, D., and Chen, B. "Conjoining gestalt rules for abstraction of architectural drawings", ACM Trans. Graph. 30, 6 (2011), 185:1-185:10.

Nelson, G. "Juno, a constraint-based graphics system", ACM SIGGRAPH Computer Graphics, vol. 19 (1985), 235-243.

Pavlidis, T., and VanWyk, C. "An automatic beautifier for drawings and illustrations", ACM SIGGRAPH Computer Graphics, vol. 19 (1985), 225-234.

Raisamo, R., and Raiha, K.-J. "A new direct manipulation technique for aligning objects in drawing programs", UIST (l996), 157-164.

Reinert, B., Ritschel, T., and Seidel, H.-P. "Interactive by-example design of artistic packing layouts", ACM Trans. Graph. 31, 6 (2013), Article No. 218.

Ryall, K., Marks, J., and Shieber, S. "An interactive constraint-based system for drawing graphs", UIST '97 (1997), 97-104.

Saund, E., Fleet, D., Larner, D., and Mahoney, J. "Perceptually-supported image editing of text and graphics" UIST '03 (2003), 183-192.

Scarr, J., Cockburn, A., Gutwin, C., and Bunt, A. "Improving command selection with commandmaps", CHI '12 (2012), 257-266.

Tollis, I., Eades, P., DiBattista, G., and Tollis, L. "Graph drawing: algorithms for the visualization of graphs", vol. I. Prentice Hall New York, 1998.

Xu, P., Fu, H., Au, 0. K.-C., and Tai, C.-L. "Lazy selection: a scribble-based tool for smart shape elements selection", ACM Transactions on Graphics 31, 6 (2012), Article No. 142.

* cited by examiner

GROUP-AWARE COMMAND-BASED ARRANGEMENT OF GRAPHIC ELEMENTS

TECHNICAL FIELD

The disclosed subject matter relates to graphic applications that rely on command-based arrangement tools to achieve precise display layouts on complex display devices.

BACKGROUND

Graphic applications typically rely on command-based arrangement tools to achieve precise layouts. These command-based arrangement tools have not evolved in any appreciable manner since they were initially implemented many years ago in various graphic editors. Generally, these command-based arrangement tools still operate on a single group of graphic display elements that are distributed consistently with an arrangement axis implied by a command. This demands a tedious and error-prone process with repeated element selections and further arrangement commands.

DETAILED DESCRIPTION

Figure 1:
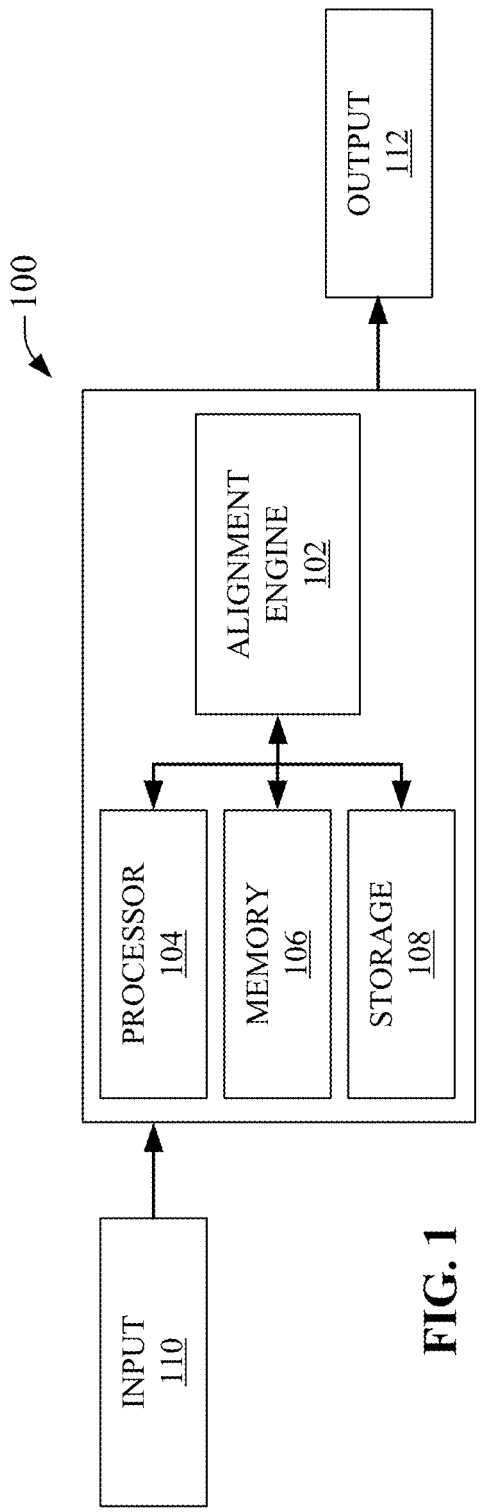
FIG. 1 is an illustration of a system for providing a group-aware command-based arrangement of graphical elements, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The subject disclosure discloses and describes a system, apparatus, or device comprising: a processor, and a memory that stores executable instructions that, when executed by the processor, facilitate performance of operations. The operations can comprise receiving an alignment command and constructing an undirected graph comprising a group of graph nodes connected by graph edges, wherein the group of graph nodes represents a group of selected display elements, and partitioning the undirected graph as a function of identifying a severable graph edge of the graph edges that connects a pair of graph nodes included in the group of graph nodes to form a first collection of graph nodes and a second collection of graph nodes. The pair of graph nodes can be representative of a pair of display elements displayed on a complex display device, and each display element comprising the group of selected display elements can each be surrounded by a bounding box.

The operations can further comprise adding the severable graph edge between the pair of graph nodes as a function of identifying an overlap of a first edge projected from a first display element of the pair of display elements to an axis that is orthogonally or perpendicularly arranged in relation to an arrangement axis and a second edge projected from a second display element of the pair of display elements to the axis that is orthogonally or perpendicularly arranged in relation to the arrangement axis, and for the pair of graph nodes, severing the severable graph edge as a function of identifying an overlap of a third edge projected from a first display element of the pair of display elements to the arrangement axis and a fourth edge projected from a second display element of the pair of display elements to the arrangement axis.

Additional operations can include distributing each display element included in the first collection of graph nodes along a first Cartesian axis or a second Cartesian axis, and subsequently separating each display element included in the first collection of graph nodes by a first separation gap (e.g., a first determined gap that separates display elements) to ensure that each display element is evenly distributed in the first Cartesian axis or the second Cartesian axis.

Further operations include distributing each display element included in the second collection of graph nodes along a first Cartesian axis or a second Cartesian axis, and thereafter separating each display element included in the second collection of graph nodes by a second separation gap (e.g., a second determined gap that separates display elements) to ensure that each display element is evenly distributed in the first Cartesian axis or the second Cartesian axis.

In accordance with a further embodiment, the subject disclosure describes a method, comprising a series of acts that can include: building a first connected graph comprising graph nodes connected by severable graph edges; and partitioning the first connected graph to form a second connected graph and a third connected graph based on identifying a severable graph edge of the severable graph edges that connects a pair of graph nodes included in the first connected graph. Each of the graph nodes can be connected by the severable graph edges that represent a display element displayed on a complex display device.

Additional acts can include adding a severable graph edge between a first graph node and a second graph node in response to identifying an overlap of a first ray projected from a bounding box edge surrounding a first display element to a first axis and a second ray projected from a bounding box edge surrounding a second display element to the first axis; disuniting the severable graph edge between a first graph node and a second graph node in response to identifying an overlap of a third ray projected from a bounding box edge surrounding a first display element to a second axis and a fourth ray projected from a bounding box edge surrounding a second display element to the second axis; distributing, by the system, each display element represented as a graph node in the second connected graph along a first Cartesian axis or a second Cartesian axis; and separating each display element represented as the graph node in the second connected graph by a first separation gap to ensure that each display element represented on a complex display is evenly distributed on the first Cartesian axis or the second Cartesian axis.

Further acts can also include distributing each display element represented as a graphic node in the third connected graph along a first Cartesian axis or a second Cartesian axis; and separating each display element represented as a graph node in the third connected graph by a second separation gap to ensure that each display element represented on a complex display device is evenly distributed on the first Cartesian axis or the second Cartesian axis.

In accordance with a still further embodiment, the subject disclosure describes a computer readable storage device comprising instructions that, in response to execution, cause a computing system comprising a processor to perform operations. The operations can include: constructing a connected graph comprising graph nodes and graph edges; and cutting a graph edge of the graph edges that connects a pair of graph nodes included in the connected graph to form a first connect graph and a second connected graph.

Additional operations in accordance with this embodiment can comprise adding a graph edge between a first graph node and a second graph node included in the connected graph based on identifying an overlap of a first ray projected from an edge of a first display element that is represented by the first graph node to a first axis and a second ray projected from an edge of a second display element represented by the second graph node to the first axis; severing the graph edge that connects the pair of nodes as a function of determining that an overlap exists between a third ray that extends to intersect a second axis from an edge of a first display element that is represented as a first node of the pair of nodes and a fourth ray that extends to intersect the second axis from an edge of a second display element that is represented as a second node of the pair of nodes; and separating each display element represented as a node in the first connected graph by a first separation gap to ensure that each display element displayed on a complex display device is evenly, equidistantly, uniformly, or proportionality distributed along a first Cartesian axis or evenly, equidistantly or uniformly distributed along a second Cartesian axis, or separating each display element represented as a node in the second connected graph by a second separation gap to ensure that each display element displayed on the complex display device is evenly, equidistantly, uniformly, or proportionality distributed along the first Cartesian axis or evenly, equidistantly, uniformly, or proportionality distributed along the second Cartesian axis.

The subject disclosure describes a command-based arrangement tool that achieves precise display layouts by reducing the number of selection operations and command invocations. Generally, an issued arrangement command can be very informative, providing instruction as to how to automatically decompose a two dimensional layout into multiple one dimensional groups, wherein each of the multiple one dimensional groups is compatible with the issued arrangement command. In accordance with this, the subject disclosure provides a parameter-free, command driven grouping approach that allows for predictable grouping results. Also, disclosed is a user interface that uses pushpins to enable explicit control of grouping and arrangement.

Creating accurate layouts of graphic display elements is vital for many graphic applications. Most modern graphic editors support command-based arrangement operations for precise alignment and/or equal spacing of graphic display elements. An arrangement command is essentially a one dimensional (1D) operation associated with an arrangement axis and applied to a set of user-selected graphical display elements. For instance, the command "align top" can be associated with a horizontal arrangement axis and changes only the vertical coordinates of the selected display elements.

Figure 8A:
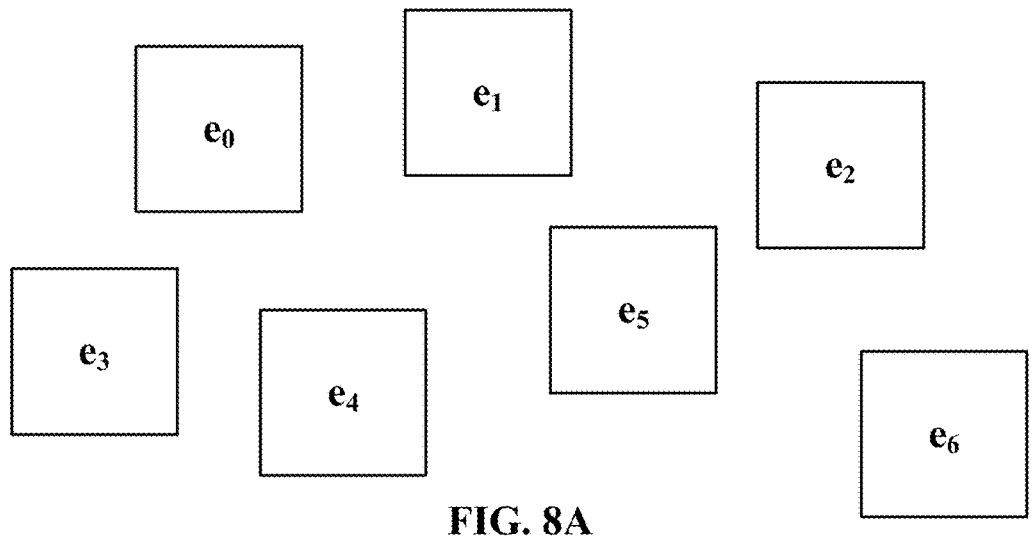
FIG. 8A illustrates a group of selected display elements in a top alignment in accordance with aspects of the subject disclosure.
Figure 8B:
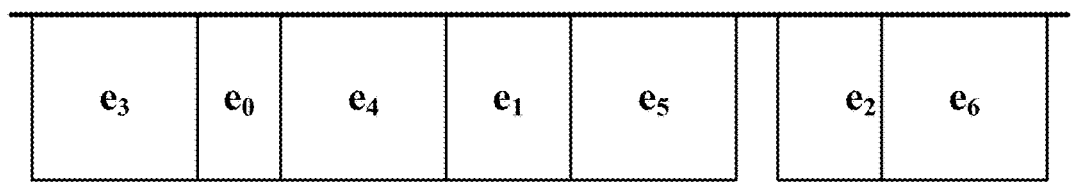
FIG. 8B illustrates a group of selected display elements in an undesirable top alignment in accordance with aspects of the subject disclosure.
Figure 8C:
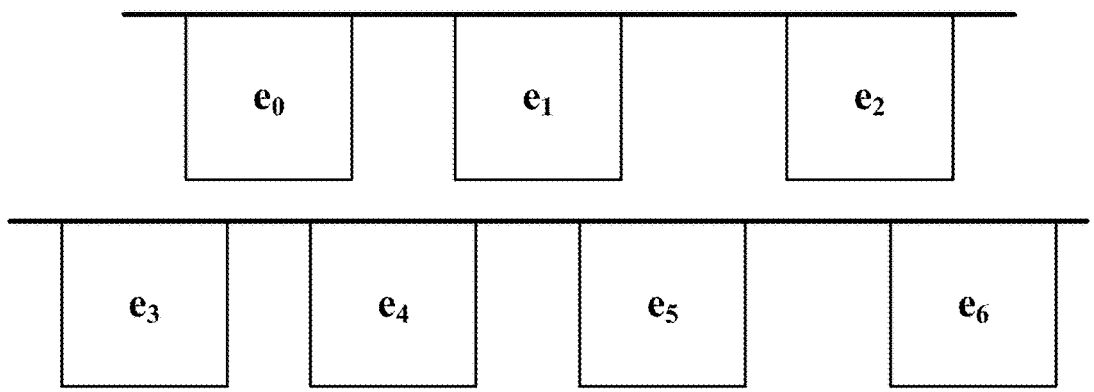
FIG. 8C illustrates a group of selected display element in a desirable top alignment in accordance with aspects of the subject disclosure.
Figure 9A:
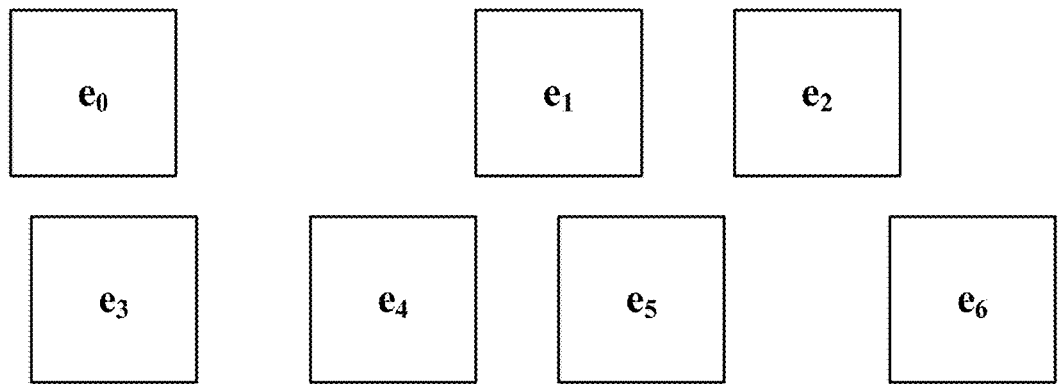
FIG. 9A illustrates a group of selected display elements displayed in a group oblivious horizontal distribution in accordance with aspects of the subject disclosure.
Figure 9B:
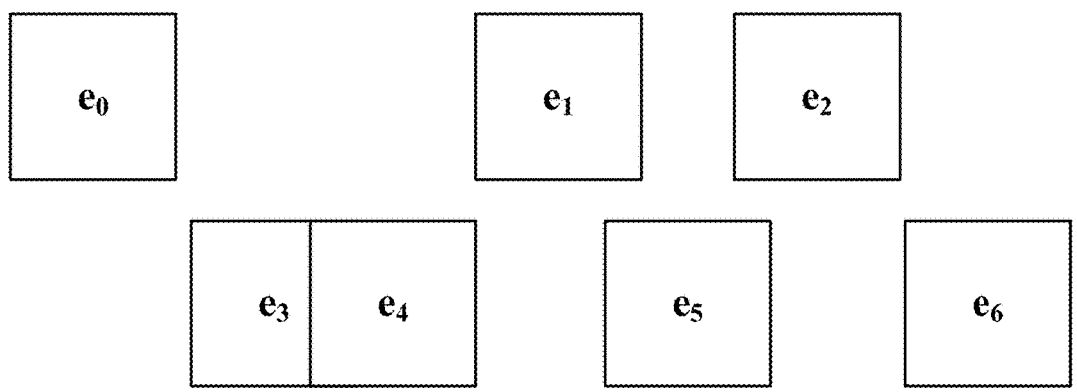
FIG. 9B illustrates a group of selected display elements displayed in an undesirable group oblivious horizontal distribution in accordance with aspects of the subject disclosure.
Figure 9C:
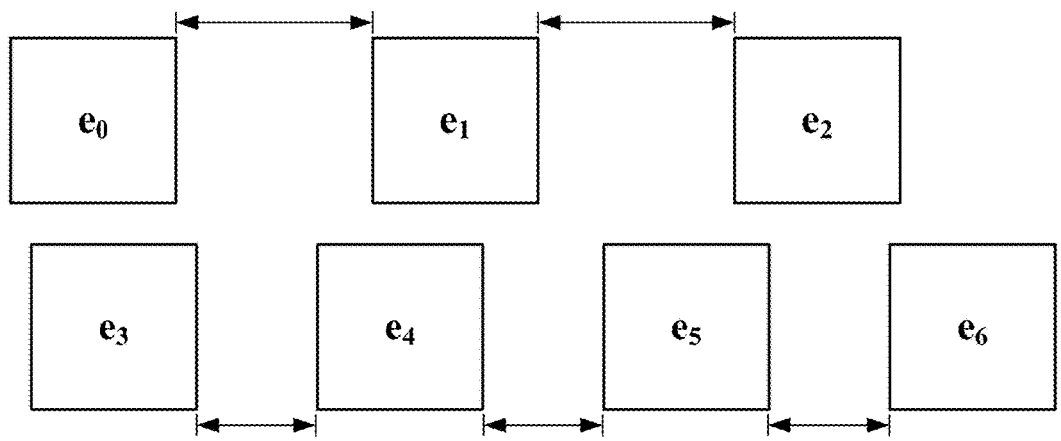
FIG. 9C illustrates a group of selected display element displayed in a preferred group oblivious horizontal distribution in accordance with aspects of the subject disclosure.

Generally, an arrangement (e.g., alignment or distribution) command works well for a group of display elements that are distributed along a corresponding axis, but can cause unexpected results when the selected elements exhibit a two-dimensional pattern instead, e.g., there are multiple element groups distributed perpendicular to the arrangement axis. FIG. 8A illustrates a simple top alignment example. From this depiction one can see that there are two vertically distributed groups: one containing display elements $\{e_0, e_1, e_2\}$ and the other containing display elements $\{e_3, e_4, e_5, e_6\}$. A simple top alignment of all display elements $\{e_0, \ldots, e_0\}$ would typically cause the undesired result illustrated in FIG. 8B, wherein elements $e_3$, $e_4$, and $e_5$ occlude display elements $e_0$ and $e_1$, element $e_6$ overlaps element $e_2$, and an unsightly gap is rendered between elements $e_5$ and $e_2$, rather than the more desired result as illustrated in FIG. 8C, wherein elements $e_0$, $e_1$, and $e_2$ are aligned in a first horizontal row and elements $e_3$, $e_4$, $e_5$, and $e_6$ are artfully placed in a second horizontal row. To overcome this deficiency, the user has to select each group of elements and apply the command to individual groups. Similarly, a group-oblivious horizontal distribution of all display elements $\{e_0, \ldots, e_6\}$ as represented in FIG. 9A causes the undesired result represented in FIG. 9B, wherein elements $e_3$ and $e_4$ are moved to rest one on top of the other and the remaining display elements $\{e_0, e_1, e_2, e_5, e_6\}$ are somewhat randomly distributed in the horizontal plane rather than the preferential result illustrated in FIG. 9C, where the inter-element distances of distances between each display element in the selection of display elements (e.g., the distances between each display element) are respectively uniform within each of the horizontal rows and/or between each horizontal row.

Motivated by the foregoing, the subject application automatically derives desired groups present in a selection of display elements when an arrangement command is issued. The issued command suggests the search for such groups perpendicular to the arrangement axis, reducing the search for a solution to a one-dimensional grouping problem.

The disclosed group aware command-based alignment or distribution system is able to significantly reduce the number of selection operations and arrangement/distribution commands for many arrangement/distribution tasks. For instance, to turn the layout illustrated in FIG. 9A into the one illustrated in FIG. 9C, two selection operations and two group-oblivious horizontal distribution commands can be reduced to a single selection operation and a single group-aware horizontal distribution command.

The subject description also provides description of an illustrative user interface that supports commonly used graphical application commands for vertical alignment ("align left", "align center", "align right"), horizontal alignment ("align top", "align middle", "align bottom"), horizontal distribution ("distribute horizontally") and vertical distribution ("distributed vertically"). Each command can be associated with either a horizontal or a vertical arrangement axis.

For purposes of simplicity of exposition and brevity, the subject application is described using a top-alignment command. The subject application nevertheless can utilize the other foregoing commonly available alignment/distribution commands, and as such those of ordinary skill can generalize the subject disclosure for applicability to these other arrangement/distribution commands.

Since the top-alignment command has a horizontal arrangement axis, to obtain desired results a user needs to roughly place or select display elements of interest to form a pattern consisting of one or more horizontal rows of display elements. For instance, in FIG. 8A a top/first horizontal row comprises or consists of elements $\{e_0, e_1, e_2\}$ and the second/bottom horizontal row comprises display elements $\{e_3, e_4, e_5, e_6\}$. Moreover it should be noted, that it is possible to have display elements that span multiple rows. To top-align display elements of interest, a user selects those display elements of interest and then issues a "align top" command from a user interface toolbar or a menu.

If there is only a single row of display elements to be top-aligned, the group-aware top-alignment operation produces an arrangement where the top edges of the selected display elements are aligned with a top edge of a top most display element. For instance, with reference to FIG. 8A the topmost edge of the topmost display element can be associated with display element $e_1$, thus a top-alignment operation applied to the display elements $\{e_0, e_1, e_2\}$ would render an alignment wherein the top edges of elements $\{e_0$ and $e_2\}$ would be aligned with the topmost edge of display element $e_1$. In cases where there are multiple horizontal rows of display elements, the group-aware top alignment operation disclosed and utilized by the subject application, can automatically identify each of the multiple horizontal rows of display elements and then apply the top-alignment command to each of the multiple horizontal rows of display elements which leads to the results as displayed in FIG. 8C.

In accordance with an aspect, the subject application discloses the use of visual cues to allow users to better understand how selected display elements will be moved by an application of an alignment/distribution command. In this embodiment, after an alignment command has been issued, the display elements before movement in accordance with the issued command can be displayed semi-transparently (e.g., using a ghosting effect). This visual effect can disappear should the user deselect any of the display elements and/or issues another arrangement command. Further, in accordance with this embodiment, to emphasize the achieved arrangement result, alignment line(s) or equal-spacing arrow(s) can be made to appear after the user issues an alignment or distribution command, respectively. Such lines or arrows can fade away within seconds or within a defined period of time to avoid visual clutter.

As will be appreciated, it is not always the case that group-aware arrangements produce more user-desired results than group-oblivious arrangements. Accordingly, the described user interface can switch between a group-aware arrangement and a group-oblivious arrangement using a button. This button can appear next to the selected display elements when there is a distinction between a group-aware arrangement and a group-oblivious arrangement of the selected display elements. Should there be no difference between the group-aware arrangement of the selected display elements and the group-oblivious arrangement of the selected display elements, then the button need not be displayed.

In addition, users can employ a virtual pushpin graphical display representation to indicate a reference display element(s) for alignment. For example, a virtual pushpin graphical display representation can be placed at/on a selected display element by employing a first right-click to fix the position of the virtual pushpin graphical display representation in association with the reference display element. A second right-click on the same display element can be used to remove the association of the virtual pushpin graphical display representation from the reference display element. Use of the virtual pushpin graphical display representation to indicate a reference display element(s) amongst the selected display elements can cause the alignment/distribution to vary and can lead to differing alignment/distribution results. As will be apparent, multiple virtual pushpin graphical display representations can be employed to control the determination of arrangement/distribution groups.

FIG. 1 illustrates a system 100 for providing a group-aware command-based arrangement of graphical elements, in accordance with an embodiment. As illustrated, system 100 can comprise alignment component/engine 102 that can be coupled to processor 104, memory 106, and storage 108. Alignment engine 102 can be in communication with processor 104 for facilitating operation of computer or machine executable instructions and/or components by alignment engine 102, memory 106 for storing data and/or the computer or machine executable instructions and/or components, and storage 108 for providing longer term storage of data and/or machine and/or computer executable instructions. Additionally, system 100 can also receive input 110 for use, manipulation, and/or transformation by alignment engine 102 to produce one or more useful, concrete, and tangible result and/or transform one or more articles to different states or things. Further, system 100 can also generate and output the useful, concrete, and tangible result and/or the transformed one or more articles produced by alignment engine 102 and output as output 112.

As will be observed from the foregoing, system 100 can be any type of mechanism, machine, device, facility, and/or instrument that includes a processor and/or is capable of effective and/or operative communication with a network topology. Mechanisms, machines, devices, facilities, and/or instruments that can comprise system 100 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

Alignment engine 102 in collaboration, for example, with processor 104, memory 106, and/or storage 108, and in accordance with an embodiment, can receive, as input 110, an alignment command and a grouping of selected display elements, wherein each of the selected display elements is displayed on a complex display device, such as a display monitor. In response to receiving the alignment command and the grouping of selected display elements, alignment engine 102 can build or construct a connected graph (e.g., an undirected graph) comprising graph nodes and graph edges, wherein each graph node is representative of a selected display element included in the received grouping of selected display elements, and the graph edges connect pairs of the graph nodes to one another in accordance with a methodology disclosed below.

Figure 6:
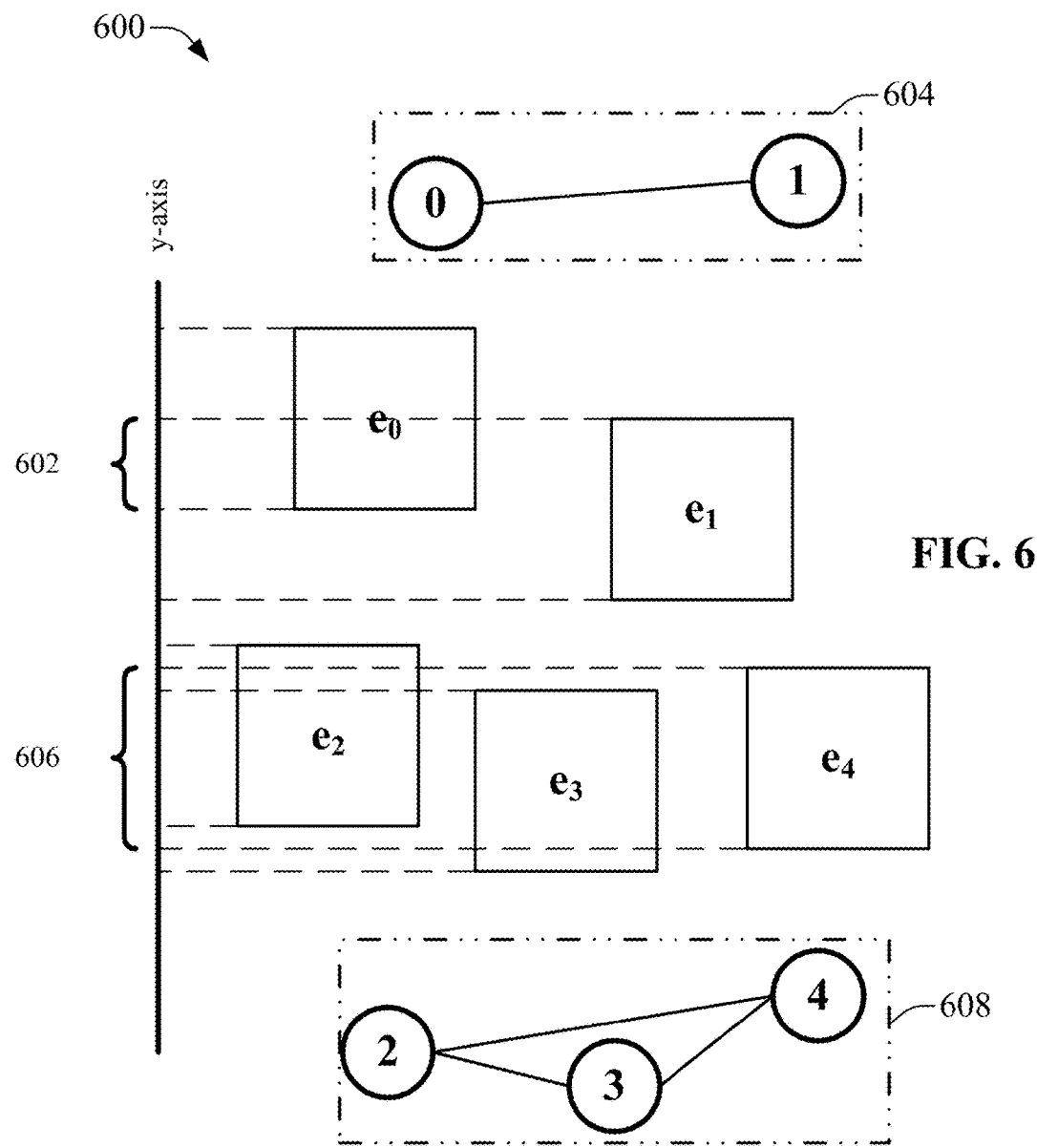
FIG. 6 illustrates a group of selected display elements and an associated connected graph in accordance with aspects of the subject disclosure.

Alignment engine 102, as a function of the fact that the selected display elements can typically be defined in a two dimensional Cartesian coordinate system, with a x-axis pointing rightward and a y-axis pointing downward, can determine whether projected vertical edges of bounding boxes surrounding each of the selected display elements projected to the y-axis overlap each other. For example, inspection of FIG. 6 illustrates a selection of display elements $\{e_0, \ldots, e_4\}$, where the projection of the respective vertical edges of selected display elements $e_0$ and $e_1$ to the y-axis yields an overlap 602 of the projected vertical edges of display elements $e_0$ and $e_1$. Similarly, also in the context of FIG. 6, with regard to selected display elements $e_2$, $e_3$, and $e_4$, the projection of their respective vertical edges to the y-axis yields the overlap 606. Alignment engine 102, based on the fact, in this instance, that there are two groups of selected display elements that overlap in the horizontal direction (e.g., overlaps respectively identified as overlap 602 and overlap 606) can deduce that there are two horizontal row groupings in the group of selected display elements.

It should be noted in regard to determining or identifying all pairs of selected display elements that overlap with one another at the y-axis; this can be a needlessly stringent requirement, thus alignment engine 102, rather than performing an overlap analysis for each and every pair of display elements included in the group of selected display elements, can relax the requirement and simply identify the projected vertical edges of one of the display elements that overlap the projected vertical edges of at least one of the other display elements included in a horizontal row. For instance, in regard to FIG. 6, alignment engine 102 respectively performs the overlap analysis as a function of selected display element $e_1$, and as a function of selected display element $e_4$. Such an overlap analysis performed by alignment engine 102 in the context of FIG. 6 yields a first horizontal grouping comprising selected display elements $e_0$ and $e_1$ ($e_1$ only overlaps $e_0$) and a second horizontal grouping comprising selected display elements $e_2$, $e_3$, and $e_4$ ($e_4$ overlaps both $e_2$ and $e_3$).

Nevertheless, it will be observed that there can be occasion where there are selected display elements that are large in height (or width as the case dictates) and, because of the larger dimensions, that can span multiple horizontal groupings. An example of such a display element that can span multiple horizontal groupings or rows is provided in FIG. 10 where selected display elements $e_0$, $e_3$, and $e_4$ are of larger dimensions to the remaining selected display elements $\{e_1, e_2, \text{ and } e_5\}$, as such there are possibilities that selected display elements $e_0$, $e_3$, and $e_4$ can be included in one or more horizontal rows or horizontal group. The appearance of such large display elements (e.g., selected display elements that are disproportionately larger than their counterpart selected display elements) in a grouping of selected display elements can lead to misidentification problems by alignment engine 102 in determining the horizontal groupings. In order to counteract such misidentification, alignment engine 102 can determine, in the case where some the selected display elements span multiple horizontal groups, whether all the selected display elements in an identified grouping overlap.

Alignment engine 102, in accordance with the foregoing, thus constructs a connected graph comprising graph nodes and graph edges, wherein each graph node corresponds to the each of the selected display elements and each graph edge connects a pair of graph nodes where the projected vertical edges from each of the pair of display elements when projected to a y-axis overlap. Referring once again to FIG. 6, the respective overlaps 602 and 604 indicate two horizontal groupings, wherein the first horizontal group can include selected display elements $e_0$ and $e_1$ and the connected graph representing this first grouping can be depicted as connected graph 604, and the second horizontal group can include the selected display elements $e_2$, $e_3$, and $e_4$, represented as connected graph 606. In connected graph 604, since only one overlap was detected by alignment engine 102 in the context of display elements $e_0$ and $e_1$, alignment engine 102 generates a first graph node (0) representing display element $e_0$ and a second graph node (1) representing display element $e_1$, and thereafter and based in the detected overlap connects the first graph node with the second graph node via a graph edge. A similar process is used by alignment engine 102 in the context of connected graph 604, where as a function of the fact that display elements $e_2$, $e_3$, and $e_4$ each overlap one another, alignment engine 102 generates a undirected connected graph 608 where the graph nodes representative of display elements $e_2$, $e_3$, and $e_4$ are connected by graph edges, such that a graph edge connects graph node (2) and graph node (3), a graph edge connects graph node (2) and graph node (4), and a graph edge connects graph node (3) and graph node (4).

Figure 7:
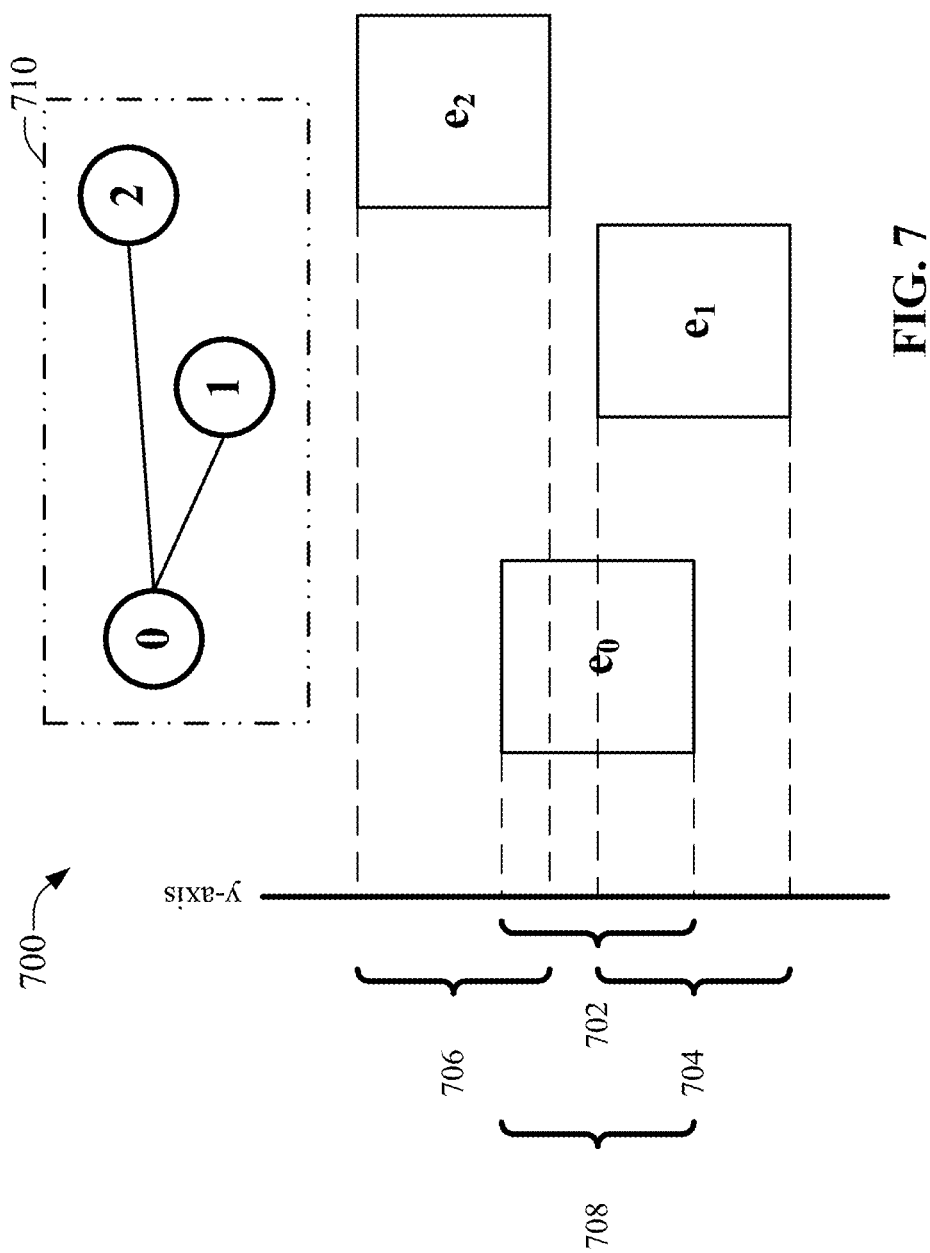
FIG. 7 illustrates a group of selected display elements and an associated connected graph in accordance with aspects of the subject disclosure.

As further illustration of construction or building a connected graph comprising graph nodes and graph edges by alignment engine 102, when alignment engine 102 receives as input 110, for instance, a top-alignment operation/command together with a selection of graphical display elements represented as $\{e_0, e_1, e_2\}$ as illustrated in FIG. 7, alignment engine 102 can perform an overlap analysis to identify overlaps between the selection of graphical display elements. In the example presented in FIG. 7 overlaps have been detected by alignment engine 102 with respect to display element $e_0$ and elements $e_1$ and $e_2$, these are represented as overlaps 702-708. As a function of, or in response to, detection of the overlaps, alignment engine 102 can construct the connected graph represented as connected graph 710. Inspection of connected graph 710 indicates that while display element $e_0$ overlaps both element $e_1$ and element $e_2$, display elements $e_1$ and $e_2$ do not overlap one another.

Figure 10:
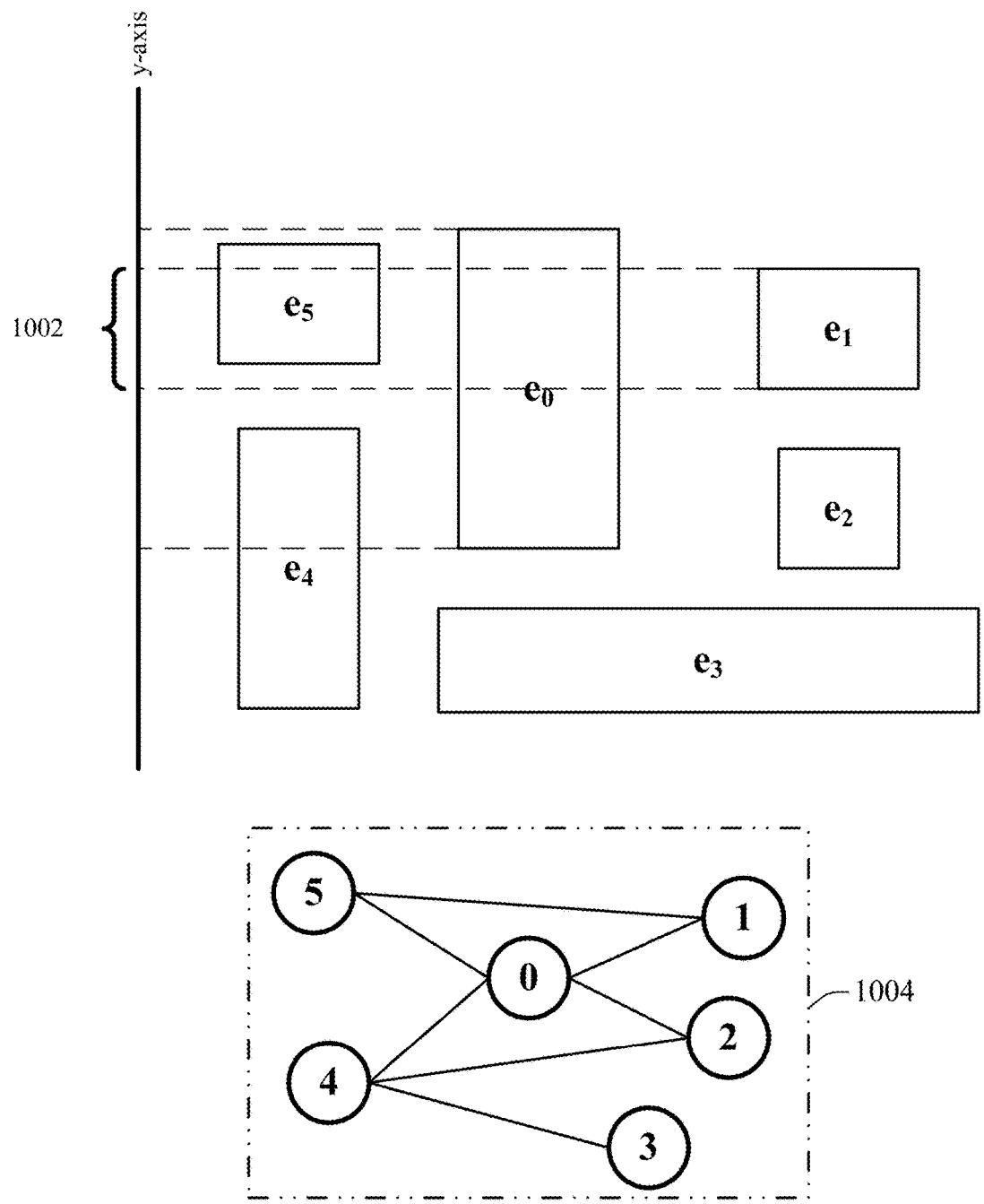
FIG. 10 illustrates a group of selected display elements and an associated connected graph in accordance with aspects of the subject disclosure.

Alignment engine 102, in the context of a received top-alignment operation/command and a received group of display elements $\{e_0, \ldots, e_5\}$ as depicted in FIG. 10, can have constructed the connected graph represented as 1004. As illustrated in FIG. 10, connected graph 1004 indicates that an overlap in a horizontal plane exists in regard to display element $e_0$ and display elements $\{e_1, e_2, e_4, e_5\}$, another overlap exists in the context of element $e_1$ and element $e_5$, a further overlap occurs with respect to element $e_2$ and element $e_4$, and there is an additional overlap in regard to elements $e_3$ and $e_4$.

Figure 11:
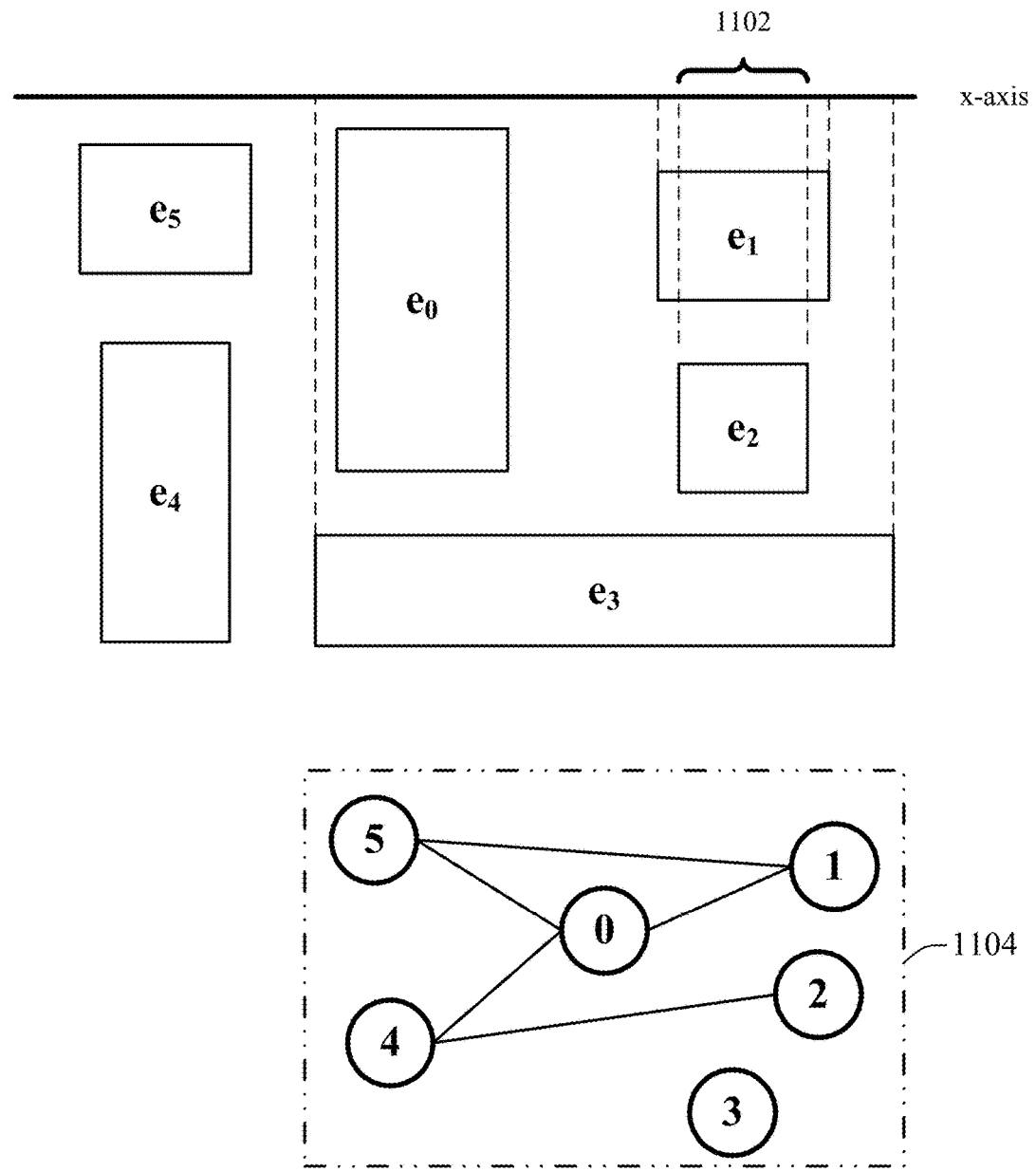
FIG. 11 illustrates a group of selected display elements and an associated connected graph in accordance with aspects of the subject disclosure.
Figure 12:
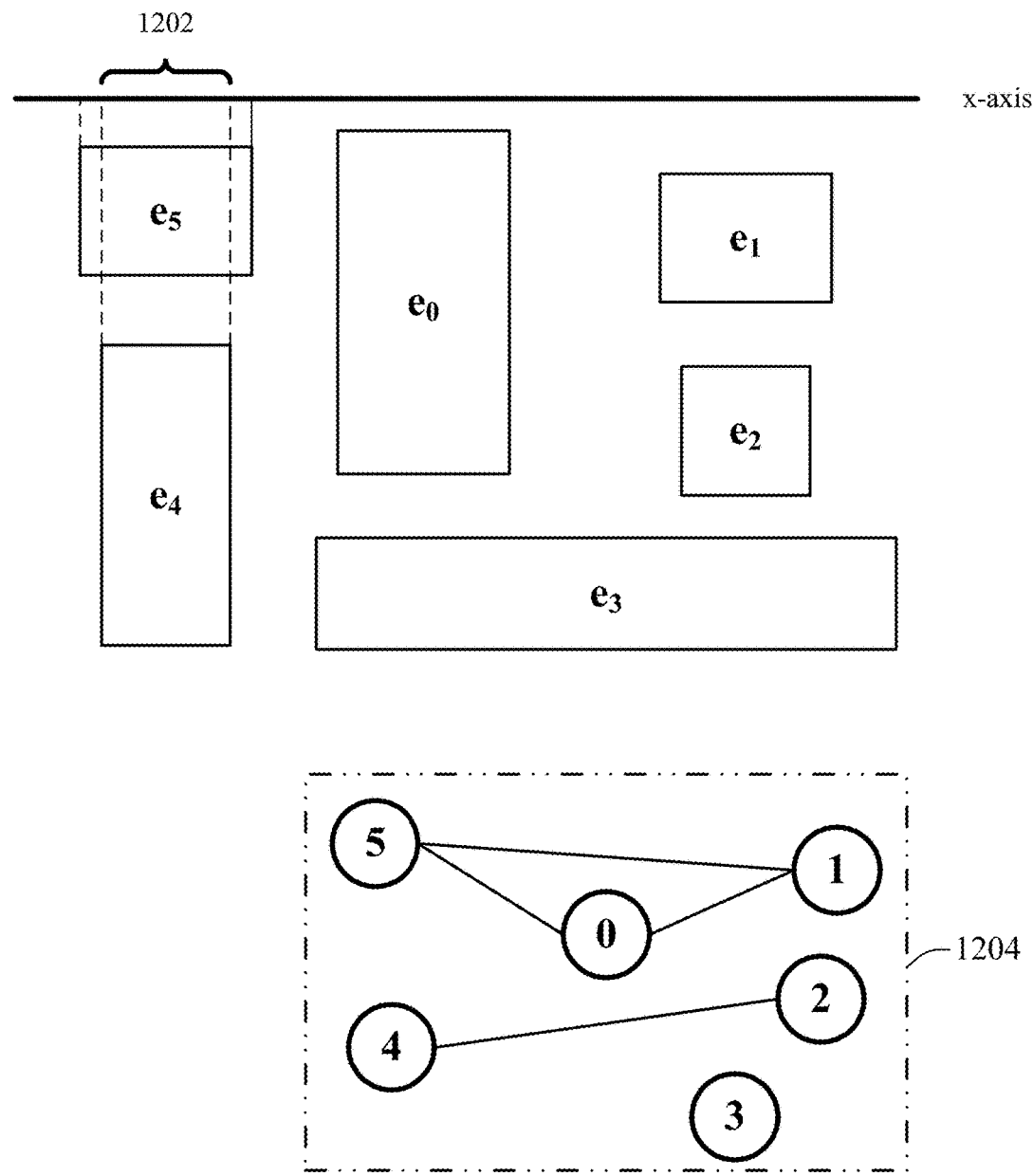
FIG. 12 illustrates a group of selected display elements and an associated connected graph in accordance with aspects of the subject disclosure.

Based on, as a function of, and/or in response to, development of connected graph 1004, alignment engine 102 can set in motion a graph partitioning process or procedure on each of the graph nodes representative of each of the received display elements $\{e_0, \ldots, e_5\}$. Alignment engine 102 can initially identify every pair of display elements whose horizontal edges when projected to the x-axis overlap with one another. In FIG. 11 it will be observed that the horizontal edges associated with display element $e_3$ when projected to the x-axis overlap all horizontal edges associated with and projected to the x-axis of display elements $e_0$, $e_1$, and $e_2$. It will also be observed that the horizontal edges associated with display element $e_2$ when projected to the x-axis overlap the horizontal edges associated with display element $e_1$ when projected to the x-axis. Based on this determination, alignment engine 102 can disassociate, disunite, or sever the edge that connects graph node (4) with graph node (3). The rational for the disassociation of the edge that connects graph node (4) with graph node (3) is because: (a) the horizontal edges associated with display element $e_2$ and display element $e_3$ when projected to the x-axis overlap one another, and as such display element $e_2$ and display element $e_3$ cannot and/or should not exist the same connected graph; (b) as will be observed, graph node (2) and graph node (3) are only connected via graph node (4); and (c) owing to the proximity of the top edge associated with display element $e_4$ being more proximate to the top edge associated with display element $e_2$, the edge connecting graph node (3) and graph node (4) can be removed.

Further, alignment engine 102 can also sever the edge that connects graph node (2) to graph node (0) since even though the horizontal edges of display element $e_0$ when projected to the x-axis overlap with the horizontal edges of display elements $e_1$ and $e_2$ when respectively projected from display element $e_1$ and display element $e_2$ to the x-axis, as depicted in FIG. 11, the horizontal edges projected from display element $e_2$ to the x-axis nonetheless overlaps the horizontal edges projected from display element $e_1$ to the x-axis. The resultant connected graph, subsequent to severing the edges between graph node (3) and graph node (4) and the edges between graph node (0) and graph node (2), is represented as connected graph 1104.

In a manner similar to the disassociation of the edge between graph node (3) and graph node (4), and the disassociation of the edge between graph node (0) and graph node (2), alignment engine 102 can determine that the horizontal edges associated with display element $e_4$ when projected to the x-axis overlap the horizontal edges associated with display element $e_5$ when projected to the x-axis, as such alignment engine 102, contemporaneously or simultaneously with severing the edge between graph node (2) and graph node (0) can also sever the edge between graph node (0) and graph node (4) since the horizontal edges associated with display element $e_4$ when projected to the x-axis are overlapped by the horizontal edges associated with display element $e_5$ when projected to the x-axis, and the projected horizontal edges of display element $e_0$ when projected to the x-axis are not overlapped by the horizontal edges associated with display element $e_5$ and projected to the x-axis. The resultant connected graph, after severing the graph edge that connects graph node (0) from graph node (4) is represented as connected graph 1204.

Figure 13:
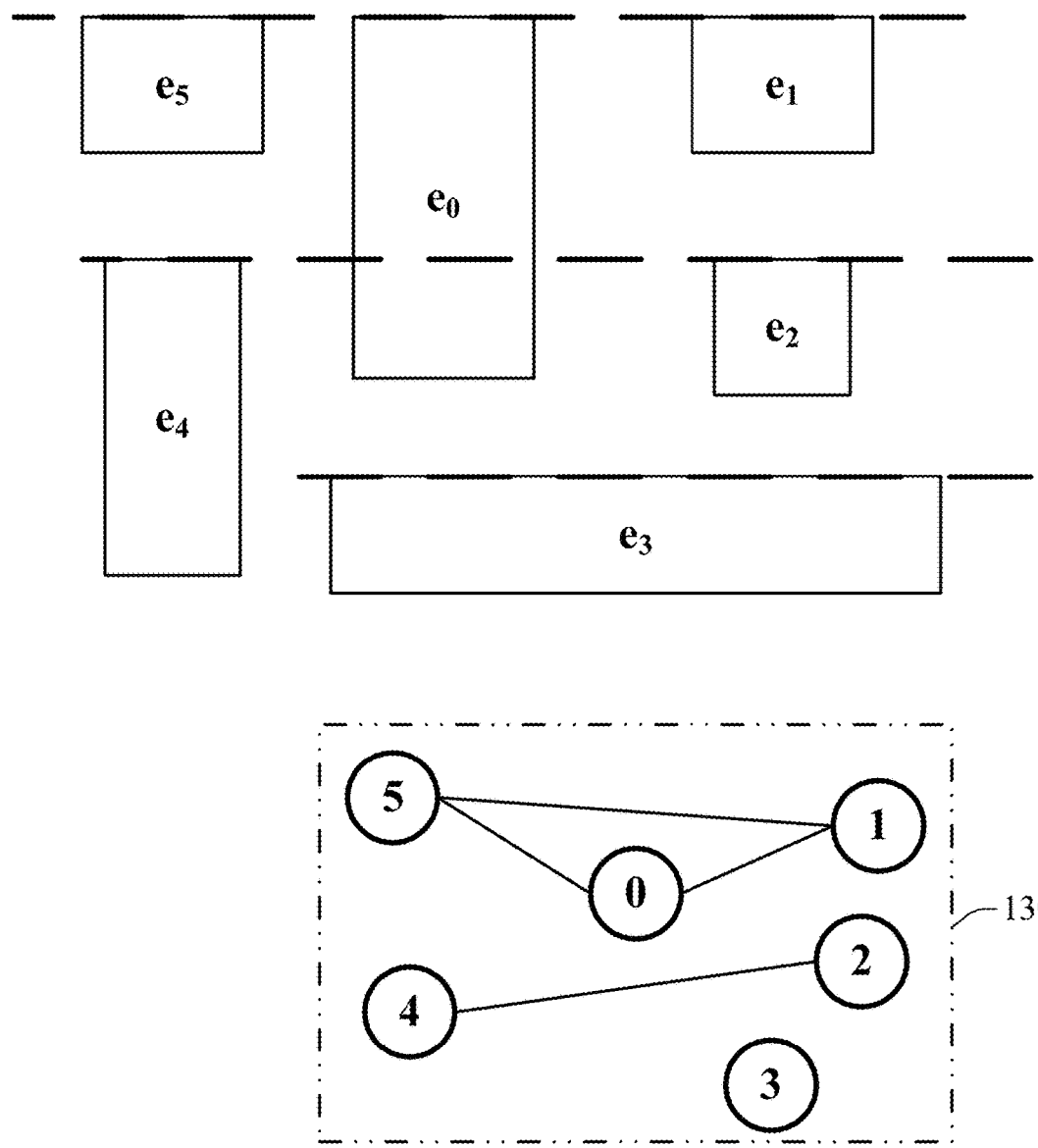
FIG. 13 illustrates a group of selected display elements and an associated connected graph in accordance with aspects of the subject disclosure.

Contemporaneously with, and/or subsequently to, disassociating, partitioning, or severing identified graph edges connecting pairs of graph nodes in the manner outlined above, alignment engine 102 can also arrange the remaining display elements as a function of the received arrangement command/operator (e.g., vertical alignment operation or horizontal alignment operation) and a determination as to a relative proximity of the remaining display elements to one or the other of the display elements represented by the graph nodes whose connecting edge was severed. For instance and with reference with FIG. 11, upon severing the connecting edge between graph node (0) and graph node (2), based on a tacit understanding that since the horizontal edges associated with display element $e_2$ when projected to the x-axis are overlapped by the horizontal edges associated with display element $e_1$ when projected to the x-axis and that accordingly the display elements $e_1$ and $e_2$ should not be allocated to the same arrangement grouping, alignment engine 102 cause an allocation of the remaining display elements in the group of selected display elements in accordance with, based on, and/or as a function of, a relative proximity of each of the remaining display elements to a top edge of one or the other of display element $e_1$ or display element $e_2$. In this instance, display elements $e_0$ and $e_5$ can be assigned to a grouping with $e_1$ and display element $e_4$ can be assigned to a grouping with display element $e_2$. Alignment engine 102 can thereafter align the grouping display elements based on the connected graph 1204 in the manner illustrated in FIG. 13.

Figure 14A:
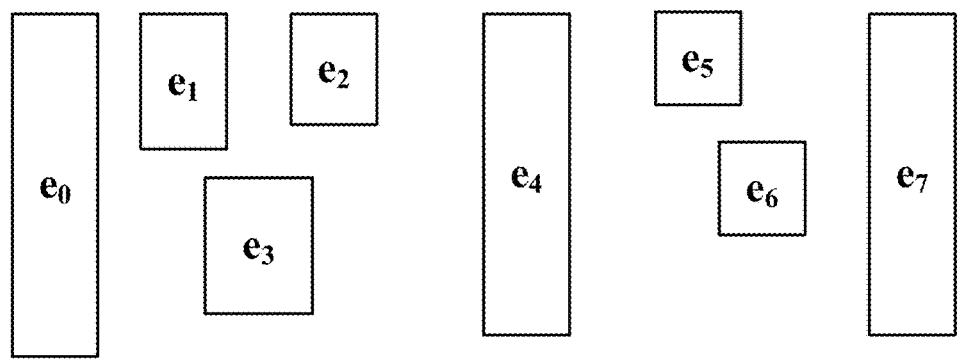
FIG. 14A illustrates a group of selected display elements in accordance with aspects of the subject disclosure.

Alignment engine 102 when handling distribution commands (e.g., horizontal distribution operations or vertical distribution operations) can construct the connected graph is a slightly different manner. In the case of receiving a horizontal distribution and a group of selected graphical display elements, for example, alignment engine 102 can develop a connected graph by establishing graph edges between pairs of graph nodes if the respective projected vertical edges associated with each of the pair of display elements projected to the y-axis overlap one another and each of the pair of display elements are horizontally adjacent (e.g., there are no other display elements between the pair of display elements at issue). For instance with reference to FIG. 14A graph nodes representative of display elements $e_0$ and $e_1$ can be connected with a graph edge, whereas graph nodes that represent display elements $e_1$ and $e_4$ cannot be connected with a graph edge since display element $e_2$ is situated adjacent to and between both display element $e_1$ and $e_4$. An illustrative connected graph developed by alignment engine 102 in accordance with the foregoing is depicted in FIG. 14B.

Figure 14B:
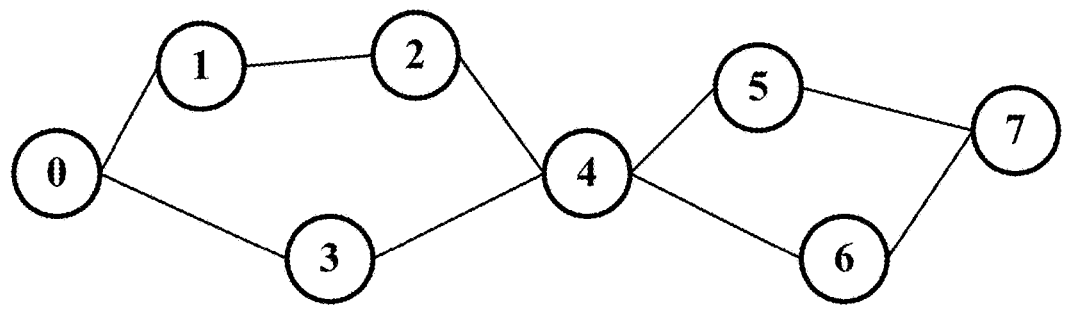
FIG. 14B illustrates a connected graph constructed in accordance with aspects of the subject disclosure.
Figure 14C:
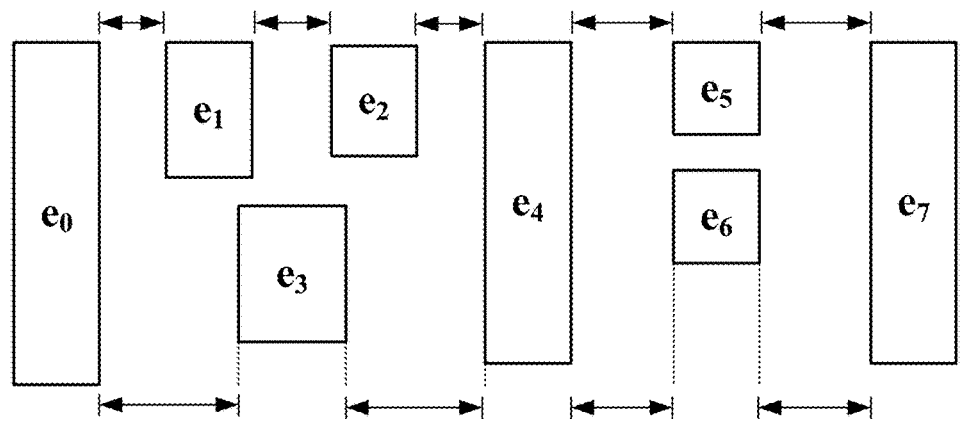
FIG. 14C illustrates a group of selected display elements arranged in a preferred manner in accordance with aspects of the subject disclosure.

Based on the connected graph constructed by alignment engine 102, and illustrated in FIG. 14B, alignment engine 102 can identify horizontal distribution groups by identifying the horizontally outermost display elements (e.g., $e_0$ and $e_7$) in each connected component and fix their positions. Alignment engine 102 can then fix the graph nodes whose degrees are greater than two. Such nodes correspond to display elements that can be shared by multiple distribution groups (e.g., display element $e_4$ represented as graph node (4)). Without fixing those nodes, their positions after distribution would highly depend on the order of applying the distribution command to individual groups, making the distribution results hard to predict. Alignment engine 102 can thereafter determine whether there are any display elements associated with virtual pushpin graphical display representations that indicate reference display elements for alignment/distribution purposes. If alignment engine 102 identifies any virtual pushpin graphical display representations associated with any display elements, alignment engine 102 can fix these nodes as well. Additionally, alignment engine 102 can identify a path starting from one fixed element to another fixed element as a distribution group. For instance, as illustrated in FIG. 14C there are four distribution groups (elements $\{e_0, e_1, e_2, e_3\}$; elements $\{e_0, e_3, e_4\}$; elements $\{e_4, e_5, e_7\}$; and elements $\{e_4, e_6, e_7\}$) that have been horizontally distributed.

In view of the example system(s) described above, example method(s) that can be implemented in accordance with the disclosed subject matter can be better appreciated with reference to flowcharts in FIGS. 2-5. For purposes of simplicity of explanation, example methods disclosed herein are presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 2:
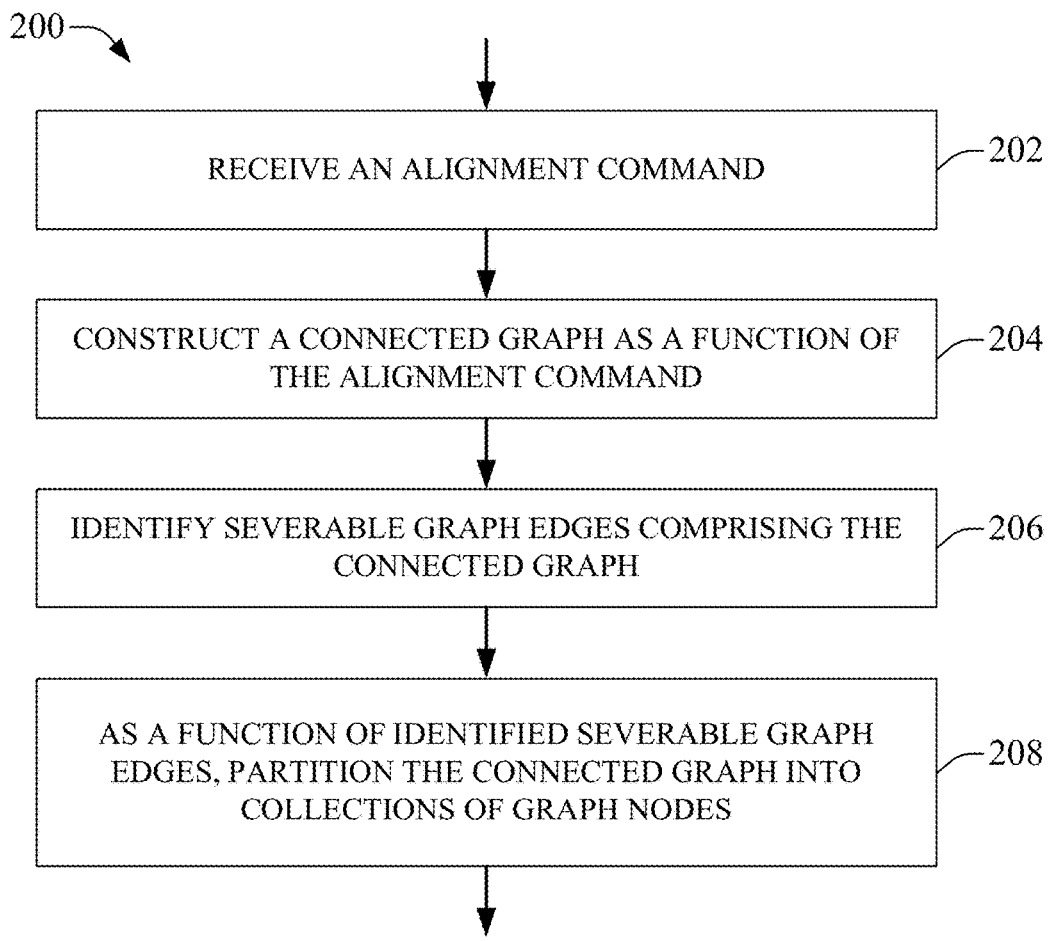
FIG. 2 provides illustration of a flow chart or method for providing a group-aware command-based arrangement of graphical elements in accordance with aspects of the subject disclosure.

FIG. 2 illustrates a group aware command-based alignment method 200 in accordance with an embodiment. As will be appreciated by those of ordinary skill, method 200 can be effectuated by system 100, and more particularly by alignment engine 102. The method can commence at 202 where a group display elements and a alignment command/operator can be received as input 110 by alignment engine 102. In response to receiving the group of display elements and the alignment command/operator, method 200 can proceed to act 204, whereupon alignment engine 102, as a function of the alignment command/operator, can dynamically construct a connected graph comprising graph nodes and graph edges, wherein each graph node represents a display element included in the group of received display elements. Once alignment engine 102 has completed construction of the connected graph, alignment engine 102 can execute act 206 by identifying severable graph edges extant between pairs of graph nodes in the constructed connected graph. On identifying a severable graph edge, alignment engine 102 can, at act 208, partition the connected graph based on the identified severable edges thereby sub-dividing or partitioning the connected graph into collections of graph nodes representative of display elements that can, as a function of the received alignment command/operator, be aligned or arranged on a complex display device.

Figure 3:
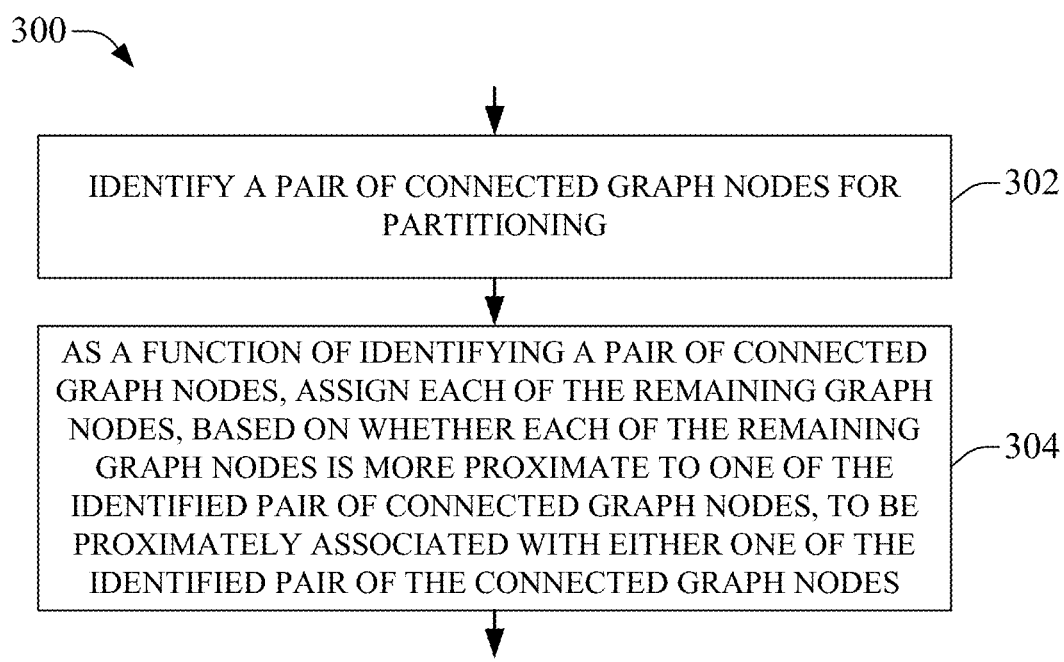
FIG. 3 provides another illustration of a flow chart or method for providing a group-aware command-based arrangement of graphical elements in accordance with aspects of the subject disclosure.

FIG. 3 provides further illustration of a group aware command-based alignment method 300 in accordance with an embodiment. Method 300 can be implemented by alignment engine 102 and can be employed when alignment engine 102 identifies, at act 302, a pair of candidate graph nodes in a constructed connected graph that have been subjected to the severing of the graph edge that connected each graph node of the identified pair of graph nodes. Once alignment engine 102 has identified such a pair of graph nodes and as a function of having identified the pair of graph nodes, alignment engine 102 can, at act 304, assign each of the remaining graph nodes (e.g., the graph nodes other than the identified pair of graph nodes), based on whether or not each of the display elements represented by the remaining graph nodes are more proximately located to one or the other of the display elements represented by the pair of graph nodes, to a first grouping that includes one of the pair of display elements or a second grouping that includes that other one of the pair of display elements.

Figure 4:
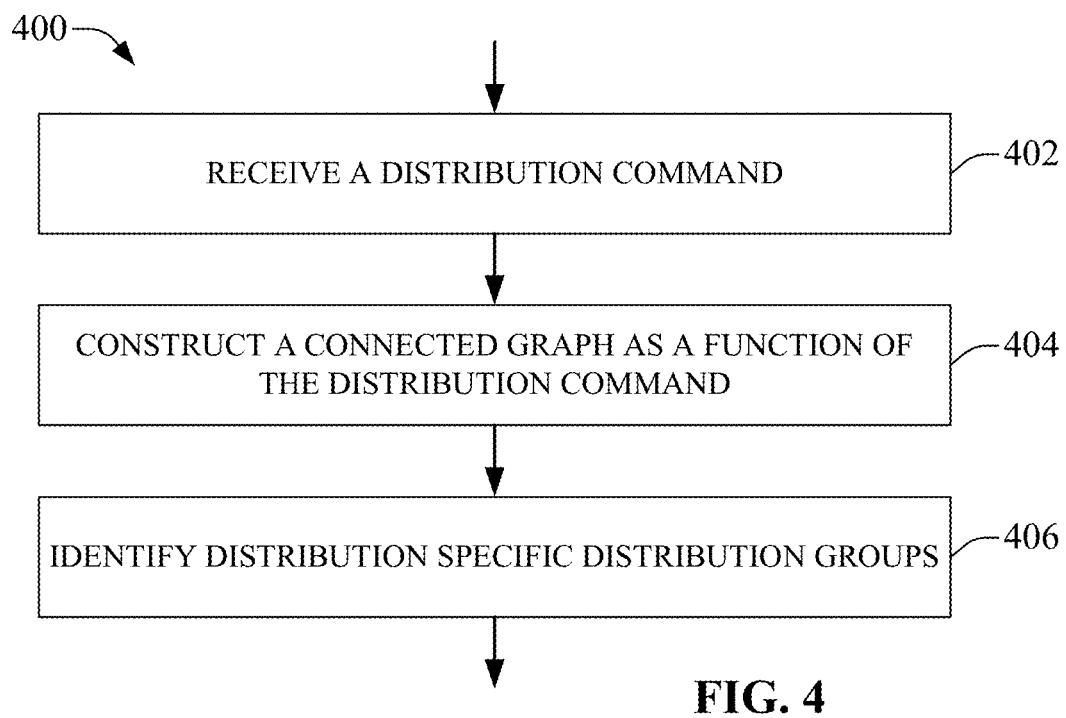
FIG. 4 illustrates another flow chart or method for providing a group-aware command-based arrangement of graphical elements in accordance with aspects of the subject disclosure.

FIG. 4 illustrates a group aware command-based distribution method 400 in accordance with an embodiment. Method 400 can be implemented by a system comprising at least one processor, such as system 100, and more particularly can be effectuated by alignment engine 102. Method 400 can therefore commence at 402 where a distribution command together with a grouping of selected display elements can be received by alignment engine 102 as input 110. At 404, alignment engine 102 can build a connected graph comprising graph nodes representative of each of the selected display elements include in the group of selected display elements and graph edges that connect the graph nodes as a function of whether vertical edges projected from each pair of selected display elements to a y-axis overlap one another and whether the pair of selected display element are adjacent to one another. Once alignment engine 102 has constructed the connected graph, alignment engine 102, at 406, can identify distribution specific (e.g., horizontal distribution or vertical distribution) distribution groups by identifying the distribution specific outermost display elements in each connected component and fix their positions; fixing the graph nodes whose degrees are greater than two; determining whether there are any display elements associated with virtual pushpin graphical display representations that indicate reference display elements for distribution; and identifying a path starting from one fixed element to another fixed element as a distribution group.

Figure 5:
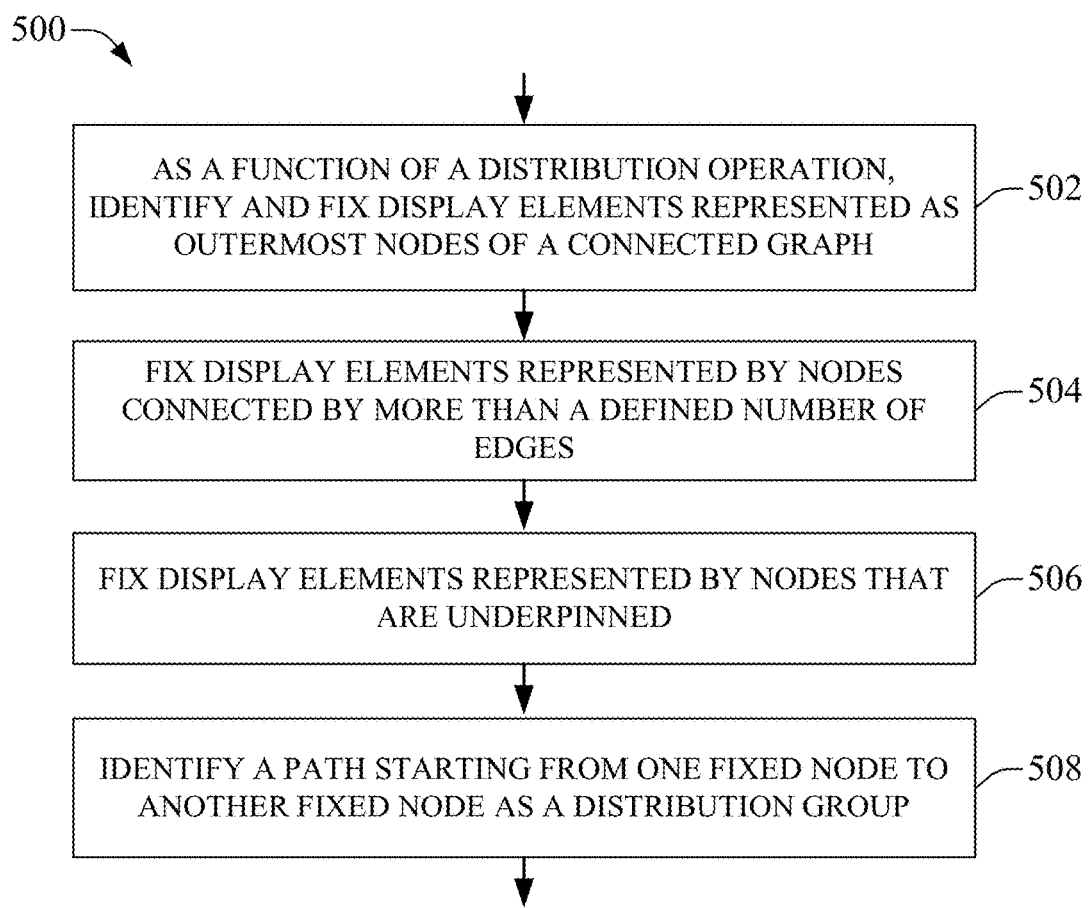
FIG. 5 illustrates another flow chart or method for providing a group-aware command-based arrangement of graphical elements in accordance with aspects of the subject disclosure.

FIG. 5 a further group aware command-based distribution method 500 in accordance with an embodiment. Method 500 can be implemented by a system comprising at least one processor, such as system 100, and more particularly can be effectuated by alignment engine 102. Method 500 can commence at 502 where alignment engine 102, as a function of a distribution operator/command, identifies and fixes the position of display elements represented as the outermost display elements in a connected graph. At 504, alignment engine 102 can fix the display elements represented by the graph nodes whose degrees of connectivity to other graph nodes are greater than two. At 506, alignment 102 can determine whether there are any display elements associated with virtual pushpin graphical display representations that indicate reference display elements for the distribution, and thereafter, at 508, alignment engine 102 can identify a path starting from one fixed element to another fixed element as a distribution group.

Figure 15:
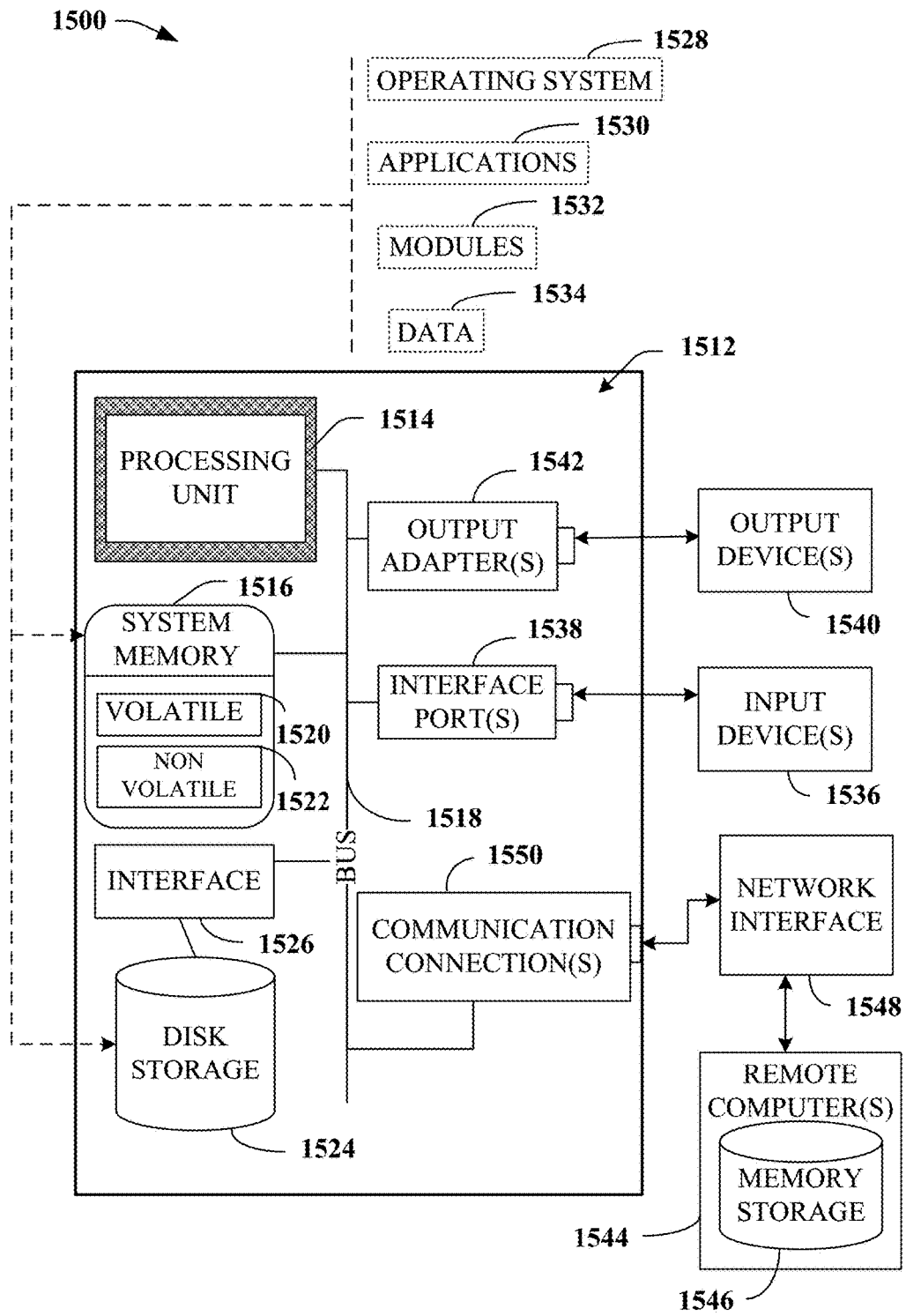
FIG. 15 illustrates a block diagram of a computing system operable to execute the disclosed systems and methods in accordance with an embodiment.

In order to provide a context for the various aspects of the disclosed subject matter, FIG. 15, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1520 (see below), non-volatile memory 1522 (see below), disk storage 1524 (see below), and memory storage 1546 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 15 illustrates a block diagram of a computing system 1500 operable to execute the disclosed systems and methods in accordance with an embodiment. Computer 1512, which can be, for example, part of the hardware of system 150, includes a processing unit 1514, a system memory 1516, and a system bus 1518. System bus 1518 couples system components including, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1516 can include volatile memory 1520 and nonvolatile memory 1522. A basic input/output system (BIOS), containing routines to transfer information between elements within computer 1512, such as during start-up, can be stored in nonvolatile memory 1522. By way of illustration, and not limitation, nonvolatile memory 1522 can include ROM, PROM, EPROM, EEPROM, or flash memory. Volatile memory 1520 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 can also include removable/non-removable, volatile/non-volatile computer storage media. FIG. 15 illustrates, for example, disk storage 1524. Disk storage 1524 includes, but is not limited to, devices like a magnetic disk drive, floppy disk drive, tape drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to system bus 1518, a removable or non-removable interface is typically used, such as interface 1526.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 15 describes software that acts as an intermediary between users and computer resources described in suitable operating environment 1500. Such software includes an operating system 1528. Operating system 1528, which can be stored on disk storage 1524, acts to control and allocate resources of computer system 1512. System applications 1530 take advantage of the management of resources by operating system 1528 through program modules 1532 and program data 1534 stored either in system memory 1516 or on disk storage 1524. It is to be noted that the disclosed subject matter can be implemented with various operating systems or combinations of operating systems.

A user can enter commands or information into computer 1512 through input device(s) 1536. As an example, mobile device 152 and/or portable device 154 can include a user interface embodied in a touch sensitive display panel allowing a user to interact with computer 1512. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1514 through system bus 1518 by way of interface port(s) 1538. Interface port(s) 1538 include, for example, a serial port, a parallel port, a game port, a universal serial bus (USB), an infrared port, a Bluetooth port, an IP port, or a logical port associated with a wireless service, etc. Output device(s) 1540 use some of the same type of ports as input device(s) 1536.

Thus, for example, a USB port can be used to provide input to computer 1512 and to output information from computer 1512 to an output device 1540. Output adapter 1542 is provided to illustrate that there are some output devices 1540 like monitors, speakers, and printers, among other output devices 1540, which use special adapters. Output adapters 1542 include, by way of illustration and not limitation, video and sound cards that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, cloud storage, cloud service, a workstation, a microprocessor based appliance, a peer device, or other common network node and the like, and typically includes many or all of the elements described relative to computer 1512.

For purposes of brevity, only a memory storage device 1546 is illustrated with remote computer(s) 1544. Remote computer(s) 1544 is logically connected to computer 1512 through a network interface 1548 and then physically connected by way of communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   at least one memory that stores executable instructions; and
   at least one processor, coupled to the at least one memory, that executes or facilitates execution of the executable instructions to perform operations, comprising:
      in response to receiving an alignment command, constructing, as a function of determining an overlap of a first vertical edge projected from a first display element of a pair of display elements to an axis that is orthogonal to an arrangement axis and a second vertical edge projected from a second display element of the pair of display elements to the axis that is orthogonal to the arrangement axis, an undirected graph comprising a group of graph nodes connected by graph edges, wherein the group of graph nodes represents a group of selected display elements comprising at least the pair of display elements;
      partitioning the undirected graph as a function of identifying a severable graph edge of the graph edges that connects a pair of graph nodes included in the group of graph nodes to form a first collection of graph nodes and a second collection of graph nodes; and
      based on determining that a selection operation is not to be performed, facilitating arrangement, on a complex display device, of each display element comprising the first collection of graph nodes along a first Cartesian axis or a second Cartesian axis, wherein the determining is based on the partitioning of the undirected graph.

2. The system of claim 1, wherein the pair of graph nodes represents a pair of display elements displayed on the complex display device.

3. The system of claim 2, wherein the operations further comprise adding the severable graph edge between the pair of graph nodes as a function of identifying the overlap of the first vertical edge projected from the first display element of the pair of display elements to the axis that is orthogonal to the arrangement axis and the second vertical edge projected from the second display element of the pair of display elements to the axis that is orthogonal to the arrangement axis.

4. The system of claim 2, wherein the operations further comprise, for the pair of graph nodes, severing the severable graph edge as a function of identifying an overlap of a first horizontal edge projected from the first display element of the pair of display elements to the arrangement axis and a second horizontal edge projected from the second display element of the pair of display elements to the arrangement axis.

5. The system of claim 1, wherein each display element comprising the group of selected display elements are each surrounded by a bounding box.

6. The system of claim 1, wherein the operations further comprise separating each display element included in the first collection of graph nodes by a first separation gap to ensure that each display element is evenly distributed in the first Cartesian axis or the second Cartesian axis.

7. The system of claim 1, wherein the operations further comprise distributing each display element included in the second collection of graph nodes along the first Cartesian axis or the second Cartesian axis.

8. The system of claim 7, wherein the operations further comprise separating each display element included in the second collection of graph nodes by a second separation gap to ensure that each display element is evenly distributed in the first Cartesian axis or the second Cartesian axis.

9. The system of claim 1, the operations further comprising in response to receiving the alignment command, facilitating display, on the complex display, of the group of selected display elements semi-transparently.

10. The system of claim 1, the operations further comprising in response to receiving the alignment command, facilitating display, on the complex display, of equal-spacing arrows associated with each display element comprising the group of selected display elements.

11. A method, comprising:
    as a function of determining an overlap of a first vertical ray projected from a first bounding box edge surrounding a first display element to a first axis and a second vertical ray projected from a second bounding box edge surrounding a second display element to the first axis, building, by a system comprising a processor, a first connected graph comprising graph nodes connected by severable graph edges;
    partitioning, by the system, the first connected graph to form a second connected graph and a third connected graph based on identifying a severable graph edge of the severable graph edges that connects a pair of graph nodes included in the first connected graph; and
    in response to a horizontal distribution operation being determined not to be performed, wherein performance of the horizontal distribution operation is determined based on the first connected graph, distributing, by the system, each display element represented as a graph node in the second connected graph along a first Cartesian axis or a second Cartesian axis.

12. The method of claim 11, wherein each of the graph nodes connected by the severable graph edges represents a display element displayed on a complex display device.

13. The method of claim 12, further comprising adding, by the system, a severable graph edge between a first graph node and a second graph node in response to identifying an overlap of the first vertical ray projected from the first bounding box edge surrounding the first display element to the first axis and the second vertical ray projected from the second bounding box edge surrounding the second display element to the first axis.

14. The method of claim 12, further comprising disuniting, by the system, the severable graph edge between a first graph node and a second graph node in response to identifying an overlap of a first horizontal ray projected from the first bounding box edge surrounding the first display element to a second axis and a second horizontal ray projected from the second bounding box edge surrounding the second display element to the second axis.

15. The method of claim 11, further comprising separating, by the system, each display element represented as the graph node in the second connected graph by a first separation gap to ensure that each display element represented on a complex display is evenly distributed on the first Cartesian axis or the second Cartesian axis.

16. The method of claim 11, further comprising distributing, by the system, each display element represented as a graphic node in the third connected graph along the first Cartesian axis or the second Cartesian axis.

17. The method of claim 16, further comprising separating, by the system, each display element represented as a graph node in the third connected graph by a second separation gap to ensure that each display element represented on a complex display device is evenly distributed on the first Cartesian axis or the second Cartesian axis.

18. A non-transitory computer-readable medium storing computer-executable instructions that, in response to execution, cause a processor to perform operations, comprising:
  in response to determining an overlap of a first vertical ray projected from a first edge of a first display element to a first axis and a second vertical ray projected from a second edge of a second display element to the first axis, constructing a connected graph comprising graph nodes and graph edges;
  cutting a graph edge of the graph edges that connects a pair of graph nodes included in the connected graph to form a first connect graph and a second connected graph; and
  in response to a selection operation and a horizontal distribution operation being determined not to be performed, wherein performance of the selection operation and the horizontal distribution operation are based on cutting the graph edge of the graph edges, separating each display element represented as a node in the first connected graph by a first separation gap to ensure that each display element displayed on a complex display device is evenly distributed along a first Cartesian axis or evenly distributed along a second Cartesian axis.

19. The non-transitory computer-readable medium of claim 18, wherein the operations further comprise adding a graph edge between a first graph node and a second graph node included in the connected graph based on identifying the overlap of the first vertical ray projected from the first edge of the first display element that is represented by the first graph node to the first axis and the second vertical ray projected from the second edge of the second display element represented by the second graph node to the first axis.

20. The non-transitory computer-readable medium of claim 18, the cutting further comprising severing the graph edge that connects the pair of nodes as a function of determining that an overlap exists between a first horizontal ray that extends to intersect a second axis from the first edge of the first display element that is represented as a first node of the pair of nodes and a second horizontal ray that extends to intersect the second axis from the second edge of the second display element that is represented as a second node of the pair of nodes.

21. The non-transitory computer-readable medium of claim 18, wherein the operations further comprise separating each display element represented as a node in the second connected graph by a second separation gap to ensure that each display element displayed on the complex display device is evenly distributed along the first Cartesian axis or evenly distributed along the second Cartesian axis.

* * * * *